US012574248B2

(12) United States Patent
Wilmer

(10) Patent No.: US 12,574,248 B2
(45) Date of Patent: Mar. 10, 2026

(54) METHOD FOR VERIFYING DIGITAL SIGNATURES, VEHICLE COMPUTING UNIT AND VEHICLE

(71) Applicant: MERCEDES-BENZ GROUP AG, Stuttgart (DE)

(72) Inventor: Thorsten Wilmer, Sindelfingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 88 days.

(21) Appl. No.: 18/292,382

(22) PCT Filed: Jul. 20, 2022

(86) PCT No.: PCT/EP2022/070300
§ 371 (c)(1),
(2) Date: Jan. 26, 2024

(87) PCT Pub. No.: WO2023/006531
PCT Pub. Date: Feb. 2, 2023

(65) Prior Publication Data
US 2024/0259213 A1       Aug. 1, 2024

(30) Foreign Application Priority Data

Jul. 27, 2021     (DE) ..................... 10 2021 003 840.1

(51) Int. Cl.
*H04W 12/106*       (2021.01)
*H04L 9/32*       (2006.01)
(52) U.S. Cl.
CPC .......... *H04L 9/3247* (2013.01); *H04L 9/3236* (2013.01); *H04L 2209/84* (2013.01)

(58) Field of Classification Search
None
See application file for complete search history.

(56) References Cited

U.S. PATENT DOCUMENTS 8,572,409 B2     10/2013   Spackman
9,424,200 B2      8/2016   Tkacik et al.
(Continued)

FOREIGN PATENT DOCUMENTS

DE     102020117552 A1     1/2021
JP       2008293033 A     12/2008
JP       2012114934 A      6/2012

OTHER PUBLICATIONS

Office Action dated Dec. 10, 2024 in related/corresponding JP Application No. 2024504907.
(Continued)

*Primary Examiner* — William J. Goodchild
(74) *Attorney, Agent, or Firm* — PATENT PORTFOLIO BUILDERS PLLC

(57) ABSTRACT
Digital signatures are verified by applying a hash function to data stored in a flash memory to generate a signature. For each written-to block of the flash memory, a hash is calculated from the data written to the respective block by a memory controller of the flash memory and stored together with the data in the block. The memory controller calculates a verification hash by applying a hash function to a hash stored in a block. A system superordinate to the flash memory reads a hash stored in a block and the verification hash for the blocks for which the signature is to be verified, calculates a check hash by applying a hash function to at least the one read-out hash, compares the calculated check hash with the read-out verification hash, and confirms the signature if the check hash matches the verification hash.

9 Claims, 2 Drawing Sheets

(56) References Cited

U.S. PATENT DOCUMENTS

| | | | |
|---|---|---|---|
| 2007/0192610 A1* | 8/2007 | Chun | G06F 21/575 |
| | | | 713/176 |
| 2013/0111212 A1 | 5/2013 | Baltes et al. | |
| 2017/0149562 A1* | 5/2017 | Takada | H04L 9/0891 |
| 2018/0113703 A1* | 4/2018 | Tschache | H04L 9/3242 |
| 2018/0183605 A1 | 6/2018 | Kawabata et al. | |
| 2018/0373894 A1 | 12/2018 | Kim et al. | |
| 2020/0314096 A1 | 10/2020 | Mondello et al. | |

OTHER PUBLICATIONS

International Search Report and Written Opinion mailed Nov. 17, 2022 in related/corresponding International Application No. PCT/EP2022/070300.

Office Action created Apr. 13, 2022 in related/corresponding DE Application No. 10 2021 003 840.1.

\* cited by examiner

METHOD FOR VERIFYING DIGITAL SIGNATURES, VEHICLE COMPUTING UNIT AND VEHICLE

BACKGROUND AND SUMMARY OF THE INVENTION

Exemplary embodiments of the invention relate to a method for verifying digital signatures, a vehicle computing unit with a flash memory, and a vehicle comprising such a vehicle computing unit.

With increasing digitalization, the degree of automation in vehicles is also increasing. To this end, vehicles are equipped with more and more and increasingly complex computing units for analyzing sensor signals and calculating control variables. To provide their functionality, such computing units execute machine-readable code. This code is stored in the form of software on physical data memories. To install new functionalities, eliminate bugs and/or close security gaps, such software is updated using a software update.

When a vehicle computing unit is initially booted up, for example when the vehicle is started, data are read from the physical data memory. When importing software updates, data can not only be read but also overwritten or deleted. To prevent the computing unit or the data stored in the physical data memory from being compromised, the data are typically provided with a digital signature, which can be used to recognize whether the data have been manipulated by third parties or whether a software update originates from a trustworthy sender. This ensures that only code from trustworthy sources is executed on a processor of the computing unit.

One technique on which digital signatures are based is the calculation of so-called hash values. To calculate a hash value, any data such as a text document, an image, an email, a program code or program code module, or similar is used as an input variable for a mathematical function, which calculates a sequence of digits of any length from the corresponding data. The sequence of digits can comprise numbers and/or letters. The mathematical function used for this is also known as a hash function and is ideally deterministic. This means that by using the same input data, the same result, i.e., the same hash value, is always calculated using a specific hash function. A hash function should be so powerful that no different data exist that could lead to the same hash value.

Checksums are used to check whether data stored in a memory element of a physical data memory have been written "correctly". This is known as a cyclic redundancy check (CRC). This means that errors can occur when writing and/or reading data from the data memory, causing the data to be read or written incorrectly. CRC is suitable for recognizing random errors. If the integrity of the data is also to be checked, cryptographic hash functions must be used instead of checksums. For this purpose, a hash is formed from the written or read data and compared with a comparison hash. Hashes exchanged between systems can be transmitted in encrypted form in accordance with proven signature verification procedures. If the two hashes match, this means that the data have been written or read correctly. However, checking the data is comparatively time-consuming, as a hash value must be created for the corresponding data for each check.

Various storage media, such as hard disks or flash memories, are known for storing data. Distributed devices such as embedded systems, for example a vehicle control unit, typically use flash memory to store relevant data. Such a flash memory can also be permanently integrated into a computing unit, for example in a system on a chip (SOC). Such a flash memory comprises at least one memory element for storing the data and a memory controller for addressing the respective memory element. The memory element in turn has the structure of blocks and pages. The memory element here comprises a large number of blocks, which in turn each comprise a large number of pages. Data are stored in the flash memory page by page and deleted block by block.

DE 10 2020 117 552 A1 discloses secure hybrid boot systems and secure boot methods for hybrid systems. Such a hybrid system comprises several different sub-systems, each sub-system having its own storage device for storing software and its own CPU, i.e., a processor, for executing the software. To increase cyber security, a signature-based authenticity validation check of the software contained on various storage devices is carried out during a boot process of a corresponding sub-system or a corresponding hybrid device. Such a boot procedure provides that a first sub-system has a first signature corresponding to a first hash of the software stored on the first sub-system in the storage device. The first hash of the first software is transmitted from the first sub-system to the second sub-system, which has a second signature corresponding to the first hash of the first software. The authenticity validation check is then performed by comparing the corresponding hashes.

Exemplary embodiments of the present invention are directed to a method for verifying digital signatures, with the aid of which the storing, reading and/or deleting of data in or from a storage element of a flash memory is accelerated.

In a method for verifying digital signatures of the type mentioned at the outset, a hash processed to generate a signature is created by applying a hash function to data stored in a flash memory. According to the invention, at least the following method steps are carried out:

> writing data to at least one memory element of the flash memory;
>
> for each written-to block of the flash memory: calculating a hash from the data written to the respective block by a memory controller of the flash memory and storing the calculated hash, together with the data, in the block;
>
> calculating, by the memory controller, a verification hash by applying a hash function to at least one hash stored in a block;
>
> reading out, by a system superordinate to the flash memory, at least one hash stored in a block and the verification hash for the blocks for which the signature is to be verified;
>
> calculating, by the system superordinate to the flash memory, a check hash by applying a hash function to at least the one read-out hash;
>
> comparing the calculated check hash with the read-out verification hash; and
>
> if the check hash matches the verification hash: confirming the signature.

The method according to the invention accelerates the verification of digital signatures of data stored in a flash memory. This makes it possible to read or overwrite the corresponding data from the flash memory more quickly. A corresponding computer system or computing unit can thus boot faster, more quickly load software to be executed, or more quickly update software stored on the flash memory. The core idea is that it is no longer necessary to generate a hash of the data stored in the flash memory to generate the check hash; instead, only the check hash is calculated by applying a hash function to the stored hash(es). The hashes can be read from the flash memory faster than the data used to train the software due to the smaller amount of data.

Any cryptographic hash function such as HAVAL, Whirlpool, or Secure Hash Algorithm (SHA), in particular SHA2 or SHA3, can be used as the hash function.

The individual hashes stored in the blocks, as well as the verification hash, are calculated here by the flash memory itself, or more precisely by the memory controller of the flash memory. The verification hash can be stored in any block of a memory element of the flash memory. As the memory controller addresses a corresponding memory element, the memory controller also knows where to read the verification hash as soon as a corresponding request is received. The flash memory is integrated into a superordinate system. The superordinate system is a computing unit. The computing unit comprises a processor for executing the software stored in the form of data on the flash memory. It is also possible for the system superordinate to the flash memory to communicate with another computing unit. In this way, data can be read from the flash memory and forwarded from the superordinate system to the other computing unit. Similarly, data can be transmitted from the other computing unit to the superordinate system and thus transferred to the flash memory for storage. For example, software updates to the software executable on the superordinate system can be imported.

If, for example, the system superordinate to the flash memory is a vehicle control unit that is to be booted, the corresponding software stored in the form of data on the flash memory is read out and executed by the processor. To read out the corresponding software, however, a successful signature verification must be carried out in order to prevent potentially manipulated data, and thus compromised software that has been introduced into the vehicle control unit, from being executed. With the aid of the method according to the invention, for signature verification it is therefore no longer necessary for calculation of the check hash to read out the respective data from the blocks and to calculate the check hash on this basis, but only to read out the hash(es) already calculated by the flash memory and stored in the flash memory and to calculate the check hash by applying the hash function to the hash(es) read out from the blocks. This is much faster. This means that the system superordinate to the flash memory can be booted more quickly, the corresponding software can be started and executed more quickly or a software update can be installed more quickly.

If a software update is installed, the data or part of the data in the individual blocks of the memory element of the flash memory is replaced or supplemented with new data. As the data changes, the corresponding hash of a corresponding block containing changed data also changes. If new or changed data are written to a block, the flash memory, i.e., the memory controller, also calculates a new hash for this block. Accordingly, it is also necessary to calculate a new verification hash, as the hash(es) on which the verification hash is based have changed.

It may be necessary here to change the firmware of the flash memory and/or of the system superordinate to the flash memory so that the memory controller can store the calculated hashes in the memory element of the flash memory or so that the hash stored in each block can be read out.

An advantageous development of the method according to the invention provides for the signature of at least one block to be verified in order to read and/or overwrite the data stored in the block. As already mentioned, this makes it possible to prevent the implementation or execution of compromised software in a vehicle control unit.

According to a further advantageous embodiment of the method, an individual page hash is generated for at least one written-to page of a block of the flash memory, i.e., the corresponding memory element, and is stored on the respective page. Data are always stored in the memory element of the flash memory in blocks and in the form of pages for each block. To provide at least one hash for a block, the corresponding hash can be stored on any page of the respective block. However, a separate hash can also be generated for one, several, or each written-to page of a block. Accordingly, a hash function can then be applied to a page hash, several page hashes or all page hashes of a block to generate the verification hash. A hash for the corresponding block can also be calculated from one or more page hashes and this block hash calculated from at least one page hash can then be used to calculate the verification hash.

In general, any combination of page and/or block hashes can be used to calculate the verification hash. However, the system calculating the check hash must have information regarding which hashes are used for the calculation in order to achieve a match between the verification hash and the check hash.

According to a further advantageous embodiment of the method according to the invention, when the signatures of at least two blocks are to be verified, the signature of a respective block is verified separately. If software is so large that the corresponding code must be stored in several blocks, each block, or the data stored there, must also be checked for integrity. This can be done individually for each block. For each block, a verification hash is calculated by the memory controller from a hash representative of the respective block (including page hashes if necessary) and stored in the corresponding block. Similarly, the system superordinate to the flash memory calculates a check hash for each block from the hashes representative of the respective blocks and compares these with the respective verification hashes. This enables a particularly secure signature verification. If data have been manipulated, the blocks with the corrupted data can be identified directly.

A further advantageous embodiment of the method according to the invention provides for the verification also of a common block signature when at least two blocks are to be verified. For this purpose, a common verification hash is calculated from the respective hashes of the blocks. This can further reduce the time required to read the data from the corresponding blocks, as the signature of the corresponding blocks can be verified even faster. It is possible here for the flash memory to generate a common signature for several blocks, i.e., the corresponding common verification hash, before data is to be read from the corresponding blocks. This is possible, for example, when initially saving, i.e., installing, software in the flash memory. In this way, the memory controller knows which data belong to the corresponding software and which blocks must be read out accordingly when the software is loaded. The memory controller can then calculate the common verification hash for these blocks in advance from the individual block hashes.

When installing an update, however, it may be necessary to replace only individual code modules of the software. These can then be stored in any blocks and pages. The memory controller therefore cannot know in advance which blocks and pages it needs to access. Thus, a possible design of the method can also provide for the memory controller to generate the corresponding verification hash only when a request to read or write data from various blocks is pending.

The reading and/or overwriting of data stored in the various blocks and pages is particularly relevant for the installation of differential software updates. For example, a signature verification is preferably performed during the execution of a differential software update of software that can be executed on the system superordinate to the flash memory. A differential software update is a software update in which only changed code modules are exchanged. This can reduce the size of the corresponding software update. This means that less data needs to be written, which shortens the time required to install the software update.

In a vehicle computing unit with a flash memory, the flash memory is set up in accordance with the invention to carry out the method described above. The vehicle computing unit can be any computing unit. For example, the vehicle computing unit can be a central on-board computer, a telematics unit, or any control unit of a vehicle subsystem. The flash memory can be designed as NAND flash or NOR flash. The flash memory can have one or more memory elements. A corresponding memory element is made up of several blocks in which data are stored page by page in memory cells. A memory element can be of any size. For example, a memory element can have a size of 100 KB, 64 MB, 1 GB, 128 GB, 1 TB, or the like. The flash memory also includes a memory controller for addressing the corresponding memory elements. The vehicle computing unit can be in communication connection with other vehicle computing units. For example, software updates can be received over-the-air from a communication module and forwarded for importing a software update, for example engine control software.

According to the invention, a vehicle comprises a vehicle computing unit as described above. The vehicle can be any vehicle such as a car, lorry, van, bus, or the like. With the aid of the method according to the invention and the vehicle computing unit according to the invention, the boot process or the loading process of software in the vehicle can be accelerated. In addition, software updates can also be implemented more quickly in a corresponding vehicle computing unit or the flash memory of the vehicle computing unit. As a signature verification is still carried out to access the flash memory, the cyber security of the corresponding vehicle computing unit is maintained.

Further advantageous variants of the method according to the invention for verifying digital signatures, the vehicle computing unit and the vehicle can also be found in the exemplary embodiments, which are described in greater detail below with reference to the figures.

BRIEF DESCRIPTION OF THE DRAWING FIGURES

DETAILED DESCRIPTION

Figure 1:
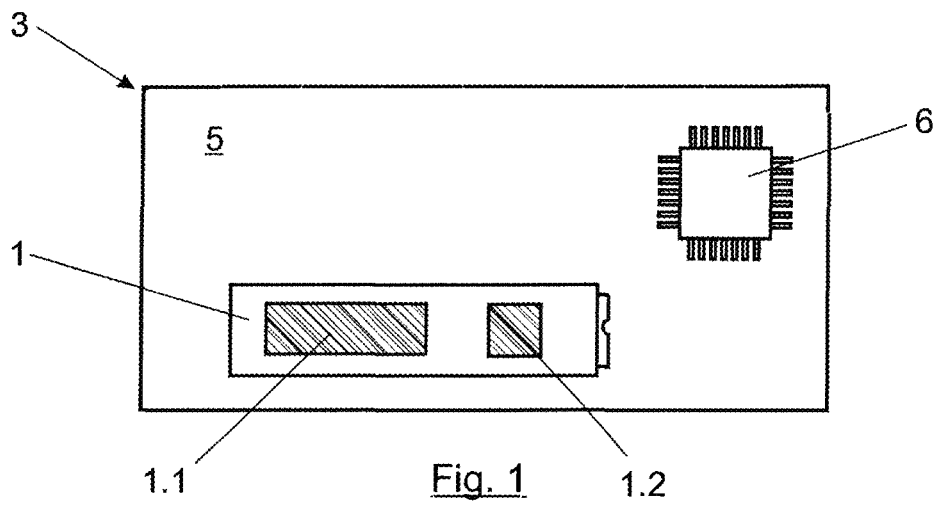
FIG. 1 shows a schematic top view of a vehicle computing unit.

FIG. 1 shows a vehicle computing unit 5, for example an engine control unit or a central on-board computer. The vehicle computing unit 5 comprises at least one flash memory 1 and thus represents a system 3 that is superordinate to the flash memory 1. Furthermore, the vehicle computing unit 5 comprises a processor 6 for executing program code stored on the flash memory 1.

The flash memory 1 also comprises at least one memory element 1.1 and a memory controller 1.2. Data are stored on a memory element 1.1. The memory controller 1.2 addresses the respective memory elements 1.1 so that the correct data are also addressed during a write or read access to the flash memory 1.

Figure 2:
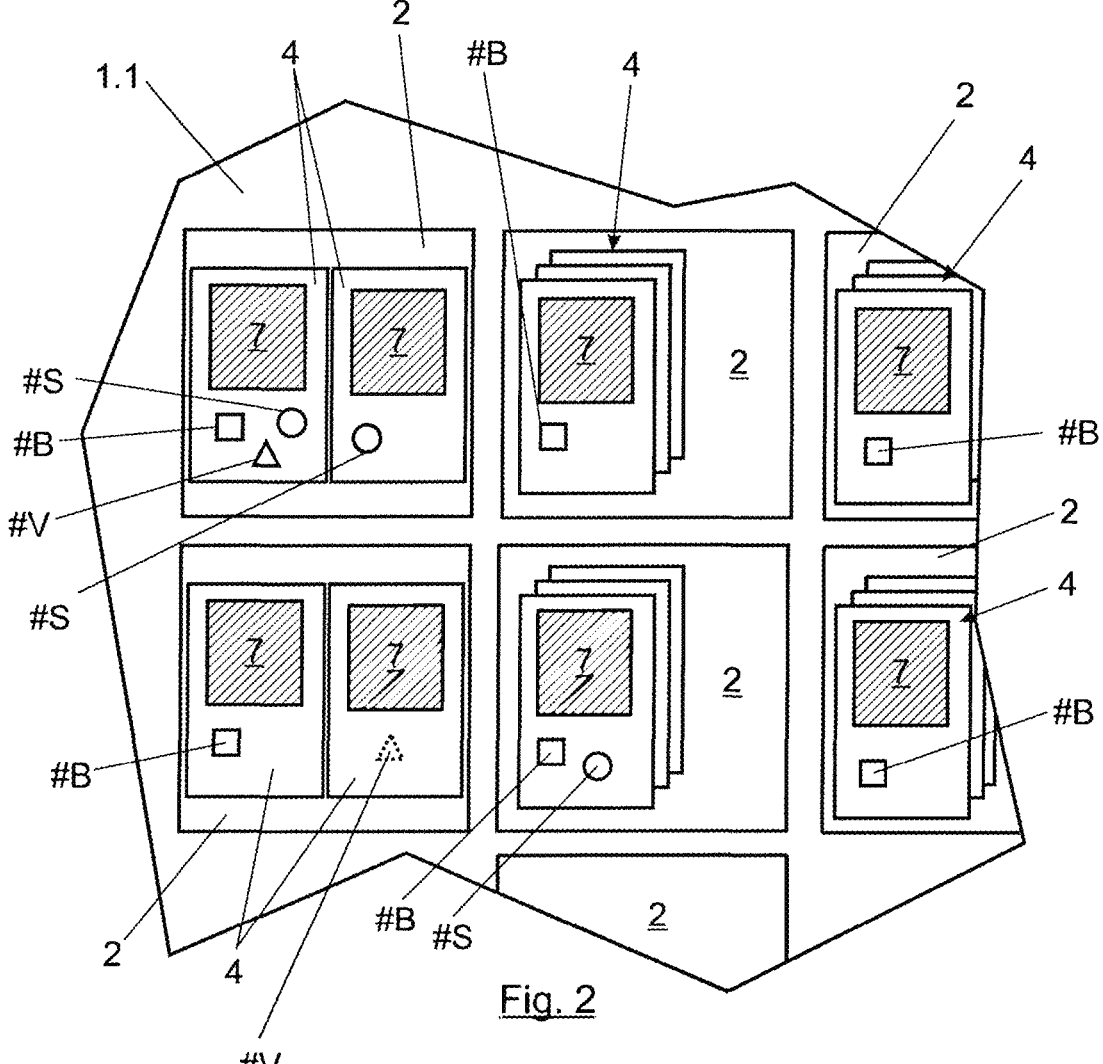
FIG. 2 shows a schematic diagram of a memory structure of a memory element of a flash memory.

FIG. 2 illustrates the structure of a memory element 1.1. For example, a memory element 1.1 comprises a large number of blocks 2 in which data to be stored are stored page by page, i.e., in the form of at least one page 4. A flash memory can only be written to page by page and deleted block by block.

To increase cyber security, a signature verification is performed before write or read access to the data stored in the flash memory 1. The verification of signatures requires the comparison of hash values. According to the prior art, at least one hash value is calculated from the data saved in the flash memory 1 and is stored. If the data are now to be accessed, a processor accessing the data also calculates a hash value from the read data. This hash value is compared with the previously calculated hash value. If both hash values match, the signature verification is confirmed. However, this takes a comparatively long time, as a hash value has to be calculated again from the data each time the data are read or written.

According to a method according to the invention, the flash memory 1, i.e., the memory controller 1.2, calculates a hash at least for each block 2 when writing the data to the flash memory 1 and stores this hash together with the data to be written in the respective block 2. The idea underlying the method according to the invention is that the hashes calculated by the flash memory 1 are read into a corresponding hash function instead of the data stored in the flash memory 1, in order to calculate the hashes used for signature verification. The advantage of this is that reading in the hashes calculated by the flash memory 1 is much faster than reading in the data itself. This means that the signature verification can be performed much faster.

For signature verification, a check hash #P (see FIG. 3) is compared with a verification hash #V. The verification hash #V is calculated from at least one block hash #B. In this way, at least one block hash #B is read into a hash function and the verification hash #V is derived from it. A respective block hash #B and the verification hash #V are stored on a page 4 of a block 2. Any page 4 can generally be used for this purpose. For example, the verification hash #V, as indicated by a dashed triangle in FIG. 2, can also be stored on a different page 4 than the block hash #B of the corresponding block 2.

It is also possible that a single page hash #S is generated for at least one page 4 of a block 2 when the data are written to the flash memory 1. In this way, a certain fraction of payload data 7, i.e., the code for implementing a program, is stored on each of the pages 4. The flash memory 1, i.e., the memory controller 1.2, reads the payload data 7 into a hash function as an input variable and uses it to calculate the respective block hashes #B and/or page hashes #S.

The payload data 7 are stored, if necessary with the page hashes #S, on a respective page 4. Once the write process is complete, the verification hash #V is determined for the corresponding blocks 2 from the respective block hashes #B using a further hash function. The verification hash #V is then also stored on any page 4 of any block 2. The individual hash functions used to calculate the hashes can be identical or different. They can also differ in terms of their power.

Blocks 2 for which the block hashes #B have been calculated differently can also be combined to calculate the verification hash #V. For example, the respective block hashes #B may have been calculated from the payload data 7 for a first number of blocks 2 and the respective block hashes #B may have been calculated from page hashes #S for a second number of blocks 2.

Figure 3:
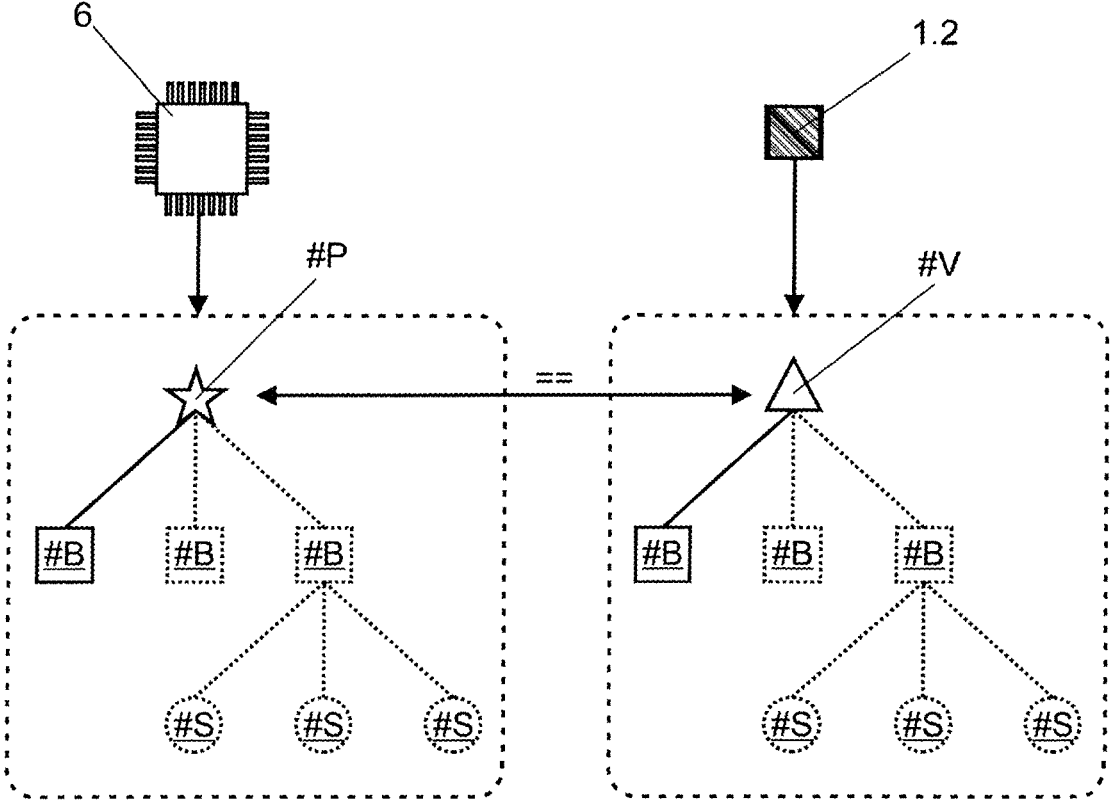
FIG. 3 shows a schematic sequence of a signature verification for read and/or write access to the flash memory.

FIG. 3 now shows a schematic sequence of the signature verification. First, the flash memory 1 or, more precisely, the memory controller 1.2 calculates, on a block-by-block basis, block hashes #B from the data to be written to the flash memory 1. A block hash #B can be calculated either directly from the payload data 7 or from the page hashes #S. The verification hash #V is then calculated from at least one block hash #B and also stored in a block 2. Since, theoretically, only one block hash #B is sufficient to calculate the verification hash #V, only one block hash #B is connected to the verification hash #V in FIG. 3 with a solid line. The dashed lines symbolize that the use of several block hashes #B and/or page hashes #S is optional for calculating the verification hash #V, or only comes into question if so much payload data 7 has to be written/read that it has to be written to or read from several blocks 2.

If the payload data 7 are now to be accessed, whether for reading, writing and/or deleting, a processor 6 of a computing unit accessing the data, for example the vehicle computing unit 5, calculates a check hash #P that corresponds expediently to the verification hash #V. If the check hash #P corresponds to the verification hash #V, then the signature verification is successful. If, on the other hand, the check hash #P and verification hash #V do not match, this indicates that the payload data 7 have been manipulated, whereupon the signature verification is rejected.

To calculate the check hash #P, the processor 6 uses the same hash functions as the flash memory 1. To calculate the check hash #P, the page hashes #S and/or block hashes #B are now read out of the flash memory 1 by the computing unit accessing the flash memory 1 instead of the payload data 7 in accordance with the method according to the invention. If the respective data were compromised between the initial storage of the data on the flash memory 1 and the readout by the corresponding computing unit, the hashes now read from the flash memory 1 no longer match the original hashes, since the memory controller 1.2 calculates new block hashes #B when writing data. However, as the verification hash #V was not changed during the manipulation process, this means that the check hash #P does not match the verification hash #V if the data have been manipulated.

However, if the data stored in flash memory 1 are changed by a trustworthy source, the verification hash #V is also recalculated after a successful signature verification.

Compromising the hash values exchanged between the computing unit and the flash memory 1 can be prevented by using proven encryption technology in the signature verification, such as encryption and decryption with private and public keys.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for verifying digital signatures, wherein a hash processed to generate a signature is created by applying a hash function to data stored in a flash memory, the method comprising:

writing data to at least one memory element of the flash memory;

calculating, for each written-to block of the flash memory by the memory controller, a hash from the data written to the respective block by a memory controller of the flash memory and storing the calculated hash together with the data in the block;

calculating, by the memory controller, a verification hash by applying a hash function to at least one hash stored in a block;

reading, by a system superordinate to the flash memory, at least one hash stored in a block of the flash memory and the verification hash for the blocks of the flash memory for which the signature is to be verified;

calculating, by the system superordinate to the flash memory, a check hash by applying a hash function to at least the read at least one hash stored in the block of the flash memory;

comparing, by the system superordinate to the flash memory, the calculated check hash with the read-out verification hash; and confirming, by the system superordinate to the flash memory responsive to the check hash matching the verification hash, the signature.

2. The method of claim 1, wherein the signature is confirmed allows reading-out or overwriting data in the block of the flash memory.

3. The method of claim 1, wherein an individual page hash is generated for at least one written-to page of a block of the flash memory and stored on the at least one written-to page.

4. The method of claim 3, wherein a hash function is applied to at least one page hash to generate the hash of a block.

5. The method of claim 1, wherein when the signatures of at least two blocks are to be verified, a signature of a respective block of the at least two blocks is verified separately.

6. The method of claim 1, wherein, for a pending verification of signatures of at least two blocks by a common signature, a verification hash is calculated from the two individual hashes of the blocks to be verified.

7. The method of claim 1, wherein a signature verification is performed during execution of a differential software update of software executable on the system superordinate to the flash memory.

8. A vehicle computing unit configured to verify digital signatures, wherein a hash processed to generate a signature is created by applying a hash function to data stored in a flash memory, wherein the vehicle computing unit comprises:

the flash memory, which includes a flash memory controller, wherein the flash memory is configured to write data to at least one memory element of the flash memory;

calculate, for each written-to block of the flash memory, a hash from the data written to the respective block by a memory controller of the flash memory and storing the calculated hash together with the data in the block;

wherein the flash memory controller is configured to calculate a verification hash by applying a hash function to at least one hash stored in a block;

wherein the vehicle computing unit is configured to read at least one hash stored in a block of the flash memory and the verification hash for the blocks of the flash memory for which the signature is to be verified;

calculate a check hash by applying a hash function to at least the read at least one hash stored in the block of the flash memory;

compare the calculated check hash with the read-out verification hash; and confirm, responsive to the check hash matching the verification hash, the signature.

9. A vehicle comprising:

a vehicle computing unit configured to verify digital signatures, wherein a hash processed to generate a signature is created by applying a hash function to data stored in a flash memory, wherein the vehicle computing unit comprises:

the flash memory, which includes a flash memory controller, wherein the flash memory is configured to write data to at least one memory element of the flash memory;

calculate, for each written-to block of the flash memory, a hash from the data written to the respective block by a memory controller of the flash memory and storing the calculated hash together with the data in the block;

wherein the flash memory controller is configured to calculate a verification hash by applying a hash function to at least one hash stored in a block;

wherein the vehicle computing unit is configured to read at least one hash stored in a block of the flash memory and the verification hash for the blocks of the flash memory for which the signature is to be verified;

calculate a check hash by applying a hash function to at least the read at least one hash stored in the block of the flash memory;

compare the calculated check hash with the read-out verification hash; and confirm, responsive to the check hash matching the verification hash, the signature.

* * * * *